Jan. 15, 1929.　　　　　　　　　　　　　　　1,698,795
J. L. HILLMAN
DENTAL X-RAY FILM HOLDER
Filed Aug. 14, 1926
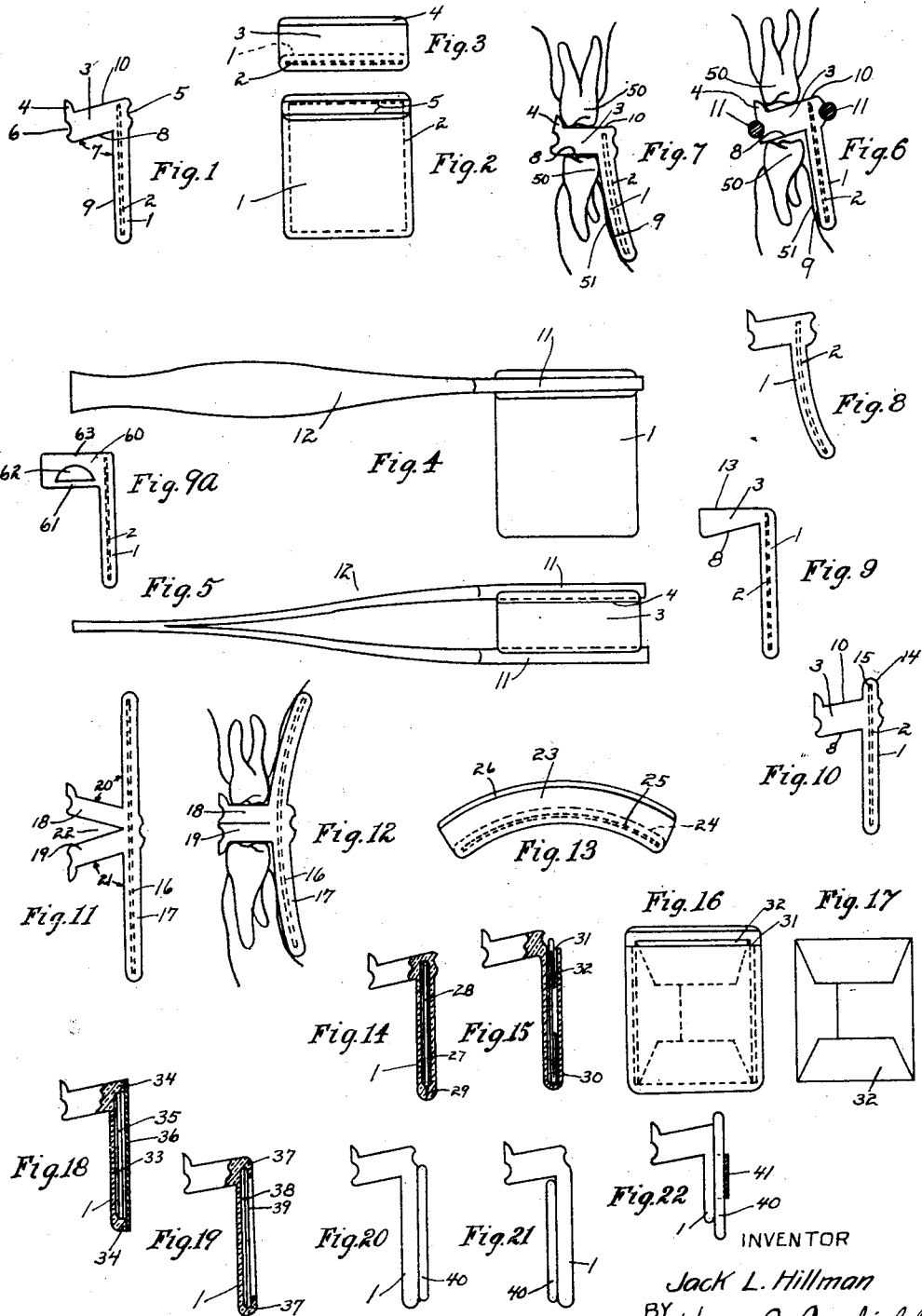
INVENTOR
Jack L. Hillman
BY Harry R. Canfield
ATTORNEY Patented Jan. 15, 1929.

1,698,795

UNITED STATES PATENT OFFICE.

JACK L. HILLMAN, OF WILLOUGHBY TOWNSHIP, LAKE COUNTY, OHIO.

DENTAL X-RAY-FILM HOLDER.

Application filed August 14, 1926. Serial No. 129,261.

This invention relates to dental X-ray film holders.

Heretofore in the making of dental radiographs, it has been the almost universal practice to hold the film packet in position in the patient's mouth by pressing it against the teeth and gums either with the patient's finger or that of the practitioner. This has been necessary in order to hold the film stationary with respect to the teeth and to hold it closely adjacent to the teeth and to conform it to the corresponding shape in order to produce a clear-cut radiograph; as well as for other well known reasons.

I am aware that means have been proposed heretofore by which the patient might hold the film by an attachment or other device held between his upper and lower teeth. But such devices have been expensive and difficult of manipulation and otherwise unsatisfactory and impractical and for these and other reasons have not come into use to any great extent.

I am also aware that film packets have been made incorporating a bite-wing or other member to be held between the teeth of the patient and that such film packets have come into use but only for radiographing the crowns and alveolar crests of the teeth.

It is one of the objects of this invention to provide an improved X-ray film holder surmounting the objections and difficulties encountered in film holders proposed heretofore; adapted to be held between the teeth and positioned by biting thereupon; and which can be used to radiograph all of a tooth or teeth including the roots thereof.

Another object is to provide an improved film holder having such characteristics that it can be placed in position in the mouth of the patient by the practitioner by means of a simple pair of forceps with little or no discomfort to the patient; and that, when the patient bites thereupon, it and/or the film will thereby be moved into position and held firmly against the teeth and adjacent gums.

Another object is to provide such a film holder adaptable for use as the film packet itself or if preferred as a holder for film packets as now being manufactured.

Another object is to provide such a film holder that will be inexpensive enough to be used once only.

Other objects will be apparent to those skilled in the art.

In the accompanying drawings, Fig. 1 is an end view of one form of my invention; Fig. 2 is a front view and Fig. 3 a top view thereof; Figures 4 and 5, respectively, are front and top views of my improved film holder being held by forceps; Fig. 6 is a view of my invention when placed between the teeth of the patient; Fig. 7 is a view of my invention when bitten upon by the patient and illustrative of the mechanical action of my invention when the patient bites upon it; Fig. 8 is a view showing how the film holder and film may be bent by the practitioner; Figures 9, 9ª and 10 are views similar to Fig. 1 showing modifications; Fig. 11 is a view similar to Fig. 1 but showing my film holder modified for use in radiographing both upper and lower teeth; Fig. 12 is a view of the film holder of Fig. 11 between the teeth of the patient; Fig. 13 is a view similar to Fig. 3 showing the film holder of greater width, and curved for radiographing a whole section of the teeth at a single exposure; Fig. 14 shows one way of combining the film holder and a film; Figures 15 and 16 are side and front views showing another way of combining the film and film holder; Fig. 17 is a view showing a very simple film packet for use with the form of Figures 15 and 16; Figures 18 to 22 inclusive are views showing other ways of combining or associating the film or film packet with the film holder.

Referring to Fig. 1, I show my improved film holder as consisting of a single piece of molded material which is soft and flexible. I preferably use rubber but any other suitable material which will not unduly obstruct the passage of the X-rays may be used.

The film holder comprises an apron 1 in which is carried the X-ray film 2; a bite-block 3 adapted to be clamped between the upper and lower teeth of the patient; and a bead or guide or rim 4 adapted to be engaged by the sides of the teeth. Along the face of the apron at 5 or in other words along one edge of the bite-block and also at 6 along the other edge of the bite-block, I preferably provide grooves adapted to be engaged by forceps or tweezers in a manner to be described. The film is shown simply imbedded in the apron to simplify the drawing and description at this point, and other modes of combining or associating the film with the apron will be disclosed later herein.

It will be noted that as shown in the drawing, the angle 7 between the plane of the under side or under face 8 of the bite-block and the inner side or face 9 of the apron is less than 90 degrees for purposes to be described. The upper plane or face 10 of the bite-block 3 is shown substantially parallel with the face 8.

The operation of or the mode of using the film holder shown in Figures 1, 2 and 3 is as follows:

The film holder is inserted between the prongs 11 of forceps or tweezers as plainly illustrated in Figures 4 and 5, the prongs of the forceps or tweezers being disposed in the grooves 5 and 6. The practitioner then places the film holder in the mouth of the patient with the bite-block 3 between the upper and lower teeth 50 and the apron against the inner sides of the teeth 50 and gums 51 as shown in Fig. 6.

It will be understood that the teeth to be radiographed in this instance are the lower teeth.

The bead or rim 4 engages the teeth as shown in Fig. 6; and with the parts in the positions shown in this figure the bead 4 holds the film holder from movement inwardly while the apron 1 prevents movement outwardly.

If the teeth to be radiographed are molars, the film can be thus positioned with respect to teeth in the forward part of the mouth, such as between the bi-cuspids, and then while still being held by the forceps or tweezers the practitioner can slide it into the position desired, causing the patient substantially no discomfort or unpleasant sensations. One of the particular discomforts, especially in the case of molars, when film packets have been used heretofore has been the tendency to gag the patient caused by pressing upon the tender flesh at the base of the tongue and by putting the fingers in the mouth to locate the film and hold it in position. Positioning the film holder as above described, however, obviates all of this disadvantage and discomfort.

When the film holder has been positioned, the patient bites upon the bite block 3, and as illustrated in Fig. 7 this act causes the apron 1 to be pressed firmly against the teeth 50 and against the gums 51 adjacent to the teeth roots and holds the apron and its film securely and immovably and accurately in the best position for obtaining a clear radiograph.

The bead 4 contributes to this result by preventing the bite-block from slipping or sliding inwardly.

The above described movement or action resulting from biting on the angularly disposed bite-block 3, will be understood by comparing Fig. 7 with Fig. 6. When the bite-block 3 is placed between the teeth the bite-block 3 is at an angle with the horizontal and the apron 1 is approximately vertical. When the patient bites upon the bite-block 3, it will be apparent that the pressure exerted by the teeth rocks the bite-block 3 into the horizontal position shown in Fig. 7 and as a consequence the apron 1, tending to move out of the vertical, is pressed against the teeth 50 and gums 51 as above described. The apron is preferably flexible but not necessarily resilient to cooperate in this action.

As a variation, if desired, the apron 1 can be partially bent or otherwise formed somewhat as illustrated in Fig. 8, before being placed in the mouth, and when it is desired to do this, a material having less resilience than rubber may be used or a flexible but relatively non-resilient component may be associated within the apron with the film.

The mechanical action above described, namely the positioning and pressing of the film supporting apron against the teeth and gums resulting from biting upon the bite-block 3 will occur even if there is no flexibility whatever in the material. Preferably I employ a soft and flexible material as described or a soft and resilient material for comfort to the patient and to enable the apron to more intimately conform to the profile of the teeth and gums but as will now be understood, material of such character is not essential.

Obviously, other means than the grooves 5 and 6 may be provided to be engaged by forceps or other positioning instruments, or such specially provided means may be omitted entirely.

While I have shown and described the angle between the bite-block and apron as less than 90 degrees to more easily and clearly bring out one of the principles of my invention, this is not a limiting feature. The advantages of my invention will be manifested if this angle is a right angle or greater, although I prefer an acute angle. Furthermore, in Fig. 9$^a$, I show a modification in which the mechanical action above described is entirely independent of the said angle; in this form, when the patient bites upon the bite-block 60, the lower face or wall 61 thereof will be bent upwardly due to the cavity or perforation 62 and to the fact that the wall 61 is relatively thin, while the face or wall 63 being relatively thick will not be bent in or will be bent in relatively little. As a result, the apron 1 will be moved out of the vertical (in Fig. 9$^a$) as and for the purpose hereinbefore described.

I have found that when the apron 1 is pressed against the gums, and even when the lower end of the apron presses against the tender flesh at or near or below the roots of the teeth very little discomfort or unpleasant sensation is felt particularly if the holder is made of soft material and all the corners or edges thereof are rounded as illustrated.

I have also particularly found by experience that what little discomfort is felt is surprisingly mitigated for the patient by his being able to bite or grit his teeth on the bite-block. There is therefore, an instinctive or psychological advantage in the use of my improved film holder which makes it markedly more comfortable to the patient than any film holder yet devised; and which contributes to the perfection of the results obtained with it.

It will be noted that the apron 1 and its associated film 2 are automatically held in the best position to obtain a clear radiograph without relying on their being so held by the patient or practitioner, which minimizes the chances that the radiograph will be blurred or out of focus or distorted or foreshortened; or that an otherwise imperfect radiographic image will be obtained on the film.

In Fig. 9 I show a modification in which only the under face 8 of the bite-block 3 is angularly disposed, the upper face 13 thereof being horizontal or at a right angle to the apron 1, and in which the bead 4 and grooves 5 and 6 have been omitted.

In Fig. 10 I show another modification in which a small extension 14 is provided at the upper end of the apron 1 in order to enable the upper edge 15 of the film 2 to stand considerably above the lower face 8 of the bite-block 3 so that all of the upper surface of the tooth being radiographed will appear on the negative with a substantial margin besides, and to even show a part of the mating tooth on the other face 10 of the bite-block 3. (See Fig. 7.) In other words, all of a lower tooth may be radiographed with sufficient of the corresponding mating upper tooth to assist in identification.

It will therefore be apparent that the principle of my invention may be embodied in a great variety of forms of bite-block and apron etc.

In Figures 11 and 12 I show my improved film holder as modified for use in radiographing both upper and lower teeth on the same film simultaneously. It consists of a film 16 of greater length, and of two bite-blocks 18 and 19. The bite-blocks 18 and 19 are disposed at angles 20 and 21 respectively, each less than 90 degrees, with the apron 17 and are separated from each other by a space 22. When the film holder is placed between the teeth and the patient bites upon it, the space 22 closes up and the holder takes up the position shown in Fig. 12, one end or one half of the apron 17 being pressed against the upper tooth or teeth and gums and the other half against the lower.

The action or movement of the parts of the film holder by which this comes about will be understood from the foregoing description in connection with the single film holder therein disclosed.

In Fig. 13, I show my film holder extended in width and curved so that when placed in the mouth the film 25 therein will be coextensive with a greater number of teeth. Only the top view, similar to Fig. 3, is shown, since it is believed that the character of the parts will be understood from the several other views of the holder which I have shown. The bite-block is shown at 23, the apron at 24, the film at 25 and the bead at 26. In this form the parts may be extended around in width for a sufficient distance, on a suitable curve, and so as to conform to the general shape of the jaw, to be wide enough to radiograph a whole section of the teeth in the jaw, such as a third a half or the whole jaw. It will be understood, of course, in this connection that when such a film and holder is used it may be necessary to move the head of the patient or to move the source of the X-rays in order to properly expose all parts of the film; but this will be understood by those skilled in the art of radiography and it is not deemed necessary to describe in detail this part of the technique of using my improved film holder.

In the foregoing I have, for the sake of simplicity in the drawing, simply indicated the film as embedded in the material of the apron 1, as at 2, 16 and 25. In practice it may be more desirable to employ other means of associating and combining the film and the apron, some of which I have illustrated in Figures 14 to 22 and will now describe.

In Fig. 14, the apron 1 is made hollow, like a bag or pouch having the interior chamber 27. The film 28, and other components usually embodied in a film packet, may be placed in the pouch and then the lower end sealed as at 29 in any suitable manner such as cementing or vulcanizing (in the case of rubber).

In Figures 15 and 16 the pouch 30 is open at the top as at 31; the film and other components are wrapped or folded within an envelope 32 as shown in Fig. 17 and the film packet 32 thus constituted is slipped into the pocket or pouch as shown in Fig. 16; sealing it therein is not necessary but may be employed.

In Fig. 18 a depression or shallow recess 33 is made in the face of the apron 1 thus providing a bead 34 around the face of the apron and the film and other components 35 are placed therein and a cover 36 is placed thereover and sealed thereupon on the bead 34.

In Fig. 19 I show an overhanging bead or undercut rim 37 around the edge of the apron 1 within which the film 38 and a light proof component 39 are placed, the resilience of the apron, if made of rubber or the like, sufficing to seal the edges of the film and components against light.

In Fig. 20 I show the apron 1 and a commercial film packet 40, the latter complete in itself and cemented or otherwise secured to the apron 1 on the side thereof to be placed opposite the teeth.

In Fig. 21 I show a form similar to that of Fig. 20 except that the film pack 40 is shown on the side of the apron 1 to be placed adjacent to the teeth.

In Fig. 22 I have shown a form in which the apron 1 is of reduced length and is provided with a strap or clamp 41 for adjustably holding a commercial or other film packet 40 on the apron.

The various figures with the exception of Figures 11 and 12 and the foregoing description are largely illustrative of my invention as used to radiograph lower teeth but it will be apparent and obvious that it may be similarly used to radiograph upper teeth.

Films of any suitable type and combined with the usual or any suitable components such as sheet lead and light excluding paper, etc., may be employed with any film or film packet holder.

I claim:

1. In a dental X-ray film holder, a bite piece adapted to be held between the teeth of a patient and an apron adapted to support a film depending from one side of the bite piece, formed at an angle thereto and integrally therewith and of flexible moisture-proof material, and a rib on the opposite side of the bite piece.

2. In a dental X-ray film holder, a bite piece adapted to be held upon the crown of a patient's tooth-to-be-photographed, by the bite of the patient, an apron depending from one side of the bite piece and formed integrally therewith of flexible moisture-proof material and comprising a pocket adapted to receive and support a film for photographing said tooth, with one edge of the film extending beyond the crown of the tooth.

3. In a dental X-ray film holder, a bite piece adapted to be held upon the crown of a patient's tooth-to-be-photographed, by the bite of the patient, an apron depending from one side of the bite piece and formed integrally therewith of flexible moisture-proof material and comprising a pocket adapted to receive and support a film for photographing said tooth, with one edge of the film extending beyond the crown of the tooth and a rib on the side of the bite piece opposite to the apron.

In testimony whereof, I have hereunto signed my name.

JACK L. HILLMAN.